United States Patent
Bao et al.

(10) Patent No.: US 12,256,382 B2
(45) Date of Patent: Mar. 18, 2025

(54) INFORMATION TRANSMISSION METHOD AND TERMINAL

(71) Applicant: VIVO MOBILE COMMUNICATION CO., LTD., Guangdong (CN)

(72) Inventors: Wei Bao, Guangdong (CN); Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 735 days.

(21) Appl. No.: 17/412,498

(22) Filed: Aug. 26, 2021

(65) Prior Publication Data
US 2021/0385841 A1    Dec. 9, 2021

Related U.S. Application Data

(63) Continuation of application No. PCT/CN2020/075857, filed on Feb. 19, 2020.

(30) Foreign Application Priority Data

Feb. 26, 2019   (CN) .......................... 201910143059.9

(51) Int. Cl.
*H04L 5/00* (2006.01)
*H04L 1/1607* (2023.01)
*H04L 1/1812* (2023.01)
*H04L 1/1867* (2023.01)
(Continued)

(52) U.S. Cl.
CPC ....... *H04W 72/1273* (2013.01); *H04L 1/1642* (2013.01); *H04L 1/1819* (2013.01); *H04L 1/1896* (2013.01); *H04W 72/23* (2023.01)

(58) Field of Classification Search
None
See application file for complete search history.

(56) References Cited

U.S. PATENT DOCUMENTS

| 10,897,779 | B2 * | 1/2021 | Li ......................... H04L 5/0055 |
| 11,871,419 | B2 * | 1/2024 | Xiong .................. H04L 5/0053 |
| 11,973,719 | B2 * | 4/2024 | Nemeth ............... H04L 1/1896 |

(Continued)

FOREIGN PATENT DOCUMENTS

| CN | 107332646 A | 11/2017 |
| CN | 107431597 A | 12/2017 |

(Continued)

OTHER PUBLICATIONS

Mediatek, Inc., "Enhancements to HARQ for NR-U operation," 3GPP TSG RAN WG1 #96 R1-1901800, Athens, Greece, Feb. 25-Mar. 1, 2019 (13 pages).

(Continued)

*Primary Examiner* — Sithu Ko
(74) *Attorney, Agent, or Firm* — Price Heneveld LLP (57) ABSTRACT

This disclosure provides an information transmission method and a terminal. The information transmission method includes: receiving DCI; determining a target bit sequence of to-be-transmitted HARQ-ACK information, where the to-be-transmitted HARQ-ACK information includes first information, and the first information is HARQ-ACK information that has not been successfully reported before and that is triggered by the DCI; and transmitting the to-be-transmitted HARQ-ACK information by using the target bit sequence.

19 Claims, 5 Drawing Sheets

(51) Int. Cl.
*H04W 72/1273* (2023.01)
*H04W 72/23* (2023.01)

(56) References Cited

U.S. PATENT DOCUMENTS

| | | |
|---|---|---|
| 2011/0243066 A1 | 10/2011 | Nayeb Nazar et al. |
| 2016/0278048 A1 | 9/2016 | Nory et al. |
| 2017/0280430 A1 | 9/2017 | Yin et al. |
| 2018/0124751 A1* | 5/2018 | Aiba ..................... H04W 72/04 |
| 2018/0167173 A1 | 6/2018 | Guan et al. |
| 2019/0159251 A1 | 5/2019 | Li et al. |
| 2019/0260516 A1 | 8/2019 | Baldemair et al. |
| 2020/0213044 A1 | 7/2020 | Peng et al. |
| 2020/0228174 A1* | 7/2020 | Nam ....................... H04L 5/005 |
| 2021/0194637 A1* | 6/2021 | Lin ....................... H04L 1/1812 |
| 2021/0250130 A1* | 8/2021 | Lei ....................... H04W 72/23 |
| 2021/0376963 A1* | 12/2021 | Liang .................... H04L 1/1858 |

FOREIGN PATENT DOCUMENTS

| | | |
|---|---|---|
| JP | 2017022726 A | 1/2017 |
| JP | 2018532287 A | 11/2018 |
| JP | 2020523811 A | 8/2020 |

OTHER PUBLICATIONS

Mediatek INC.,"Enhancements on HARQ for NR-U Operation", 3GPP TSG RAN WG1 Meeting #95, R1-1812358, Spokane, USA, Nov. 12-16, 2018.

Huawei, "HARQ enhancements in NR unlicensed", 3GPP TSG RAN WG1 Meeting #95, R1-1812196, Spokane, USA, Nov. 12-16, 2018.

"3rd Generation Partnership Project; Technical Specification Group Radio Access Network; NR; Physical layer procedures for control (Release 15)" 3GPP TS 38.213 V15.4.0 (Dec. 2018), Valbonne, France.

Samsung, "HARQ enhancements for NR-U", 3GPP TSG RAN WG1 Meeting #95, R1-1812979, Spokane, USA, Nov. 12-16, 2018.

Huawei, Hisilicon, "HARq enhancements in NR unlicensed", 3GPP TSG RAN WGI Meeting #94bis, RI-1810128, Chengdu, China, Oct. 8-12, 2018.

* cited by examiner

INFORMATION TRANSMISSION METHOD AND TERMINAL

CROSS-REFERENCE TO RELATED APPLICATIONS

This application is a continuation application of PCT Application No. PCT/CN2020/075857 filed on Feb. 19, 2020, which claims priority to Chinese Patent Application No. 201910143059.9, filed in China on Feb. 26, 2019, the disclosures of which are incorporated herein by reference in their entireties.

TECHNICAL FIELD

This disclosure relates to the field of communications technologies, and in particular, to an information transmission method and a terminal.

BACKGROUND

For a communications system operating on an unlicensed spectrum (New Radio unlicensed spectrum, NR-U), when a terminal feeds back, based on downlink scheduling signaling, hybrid automatic repeat request acknowledgement (HARQ-ACK) information corresponding to physical downlink shared channel (PDSCH) transmission, the terminal will fail to report the HARQ-ACK information as expected for various reasons, for example, because the downlink scheduling signaling is located at the tail of a channel occupancy time (COT) requested by a network device, for example, a base station gNB, and therefore cannot indicate a physical uplink control channel (PUCCH) resource within that COT, or because it is uncertain for the terminal to obtain a radio channel before performing PUCCH transmission based on indication information, or because of potential interference caused by a hidden node during PUCCH transmission.

In the case that the terminal cannot report the HARQ-ACK information as expected, the gNB may request or trigger the terminal to report the HARQ-ACK information that has not been successfully reported before. However, in the case that the gNB requests or triggers the terminal to report the HARQ-ACK information that has not been successfully reported before, it is still unclear in the related art how the terminal can effectively transmit the triggered HARQ-ACK information that has not been successfully reported before.

SUMMARY

According to a first aspect, an embodiment of this disclosure provides an information transmission method, including:
  receiving downlink control information (DCI);
  determining a target bit sequence of to-be-transmitted HARQ-ACK information, where the to-be-transmitted HARQ-ACK information includes first information, and the first information is HARQ-ACK information that has not been successfully reported before and that is triggered by the DCI; and
  transmitting the to-be-transmitted HARQ-ACK information by using the target bit sequence.

According to a second aspect, an embodiment of this disclosure further provides a terminal, including:
  a receiving module, configured to receive DCI;
  a first determining module, configured to determine a target bit sequence of to-be-transmitted HARQ-ACK information, where the to-be-transmitted HARQ-ACK information includes first information, and the first information is HARQ-ACK information that has not been successfully reported before and that is triggered by the DCI; and
  a transmitting module, configured to transmit the to-be-transmitted HARQ-ACK information by using the target bit sequence.

According to a third aspect, an embodiment of this disclosure further provides a terminal, including a memory, a processor, and a computer program stored in the memory and capable of running on the processor, where when the computer program is executed by the processor, the steps of the foregoing information transmission method are implemented.

According to a fourth aspect, an embodiment of this disclosure further provides a computer-readable storage medium, where a computer program is stored in the computer-readable storage medium. When the computer program is executed by a processor, the steps of the foregoing information transmission method are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The terms "first", "second", and the like in this specification and claims of this application are used to distinguish between similar objects, instead of describing a specific order or sequence. It should be understood that the data used in this way is interchangeable in appropriate circumstances so that the embodiments of this application described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those units, but may include other units not expressly listed or inherent to such a process, method, product, or device.

Technologies described in this specification are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are usually used interchangeably. The CDMA system can implement radio technologies such as CDMA2000 and universal terrestrial radio access (UTRA). The UTRA includes wideband CDMA (WCDMA) and other CDMA variants. The TDMA system can implement radio technologies such as the global system for mobile communications (GSM). The OFDMA system can implement radio technologies such as ultra mobile broadband (UMB), evolved UTRA (E-UTRA), IEEE 802.11 (Wireless Fidelity, Wi-Fi), IEEE 802.16 (Worldwide Interoperability for Microwave Access, WiMAX), IEEE 802.20, and Flash-OFDM. The UTRA and E-UTRA are parts of the universal mobile telecommunications system (UMTS). The LTE and more advanced LTE (such as LTE-A) are new UMTS releases that use the E-UTRA. The UTRA, E-UTRA, UMTS, LTE, LTE-A, and GSM are cited from descriptions of the documentation of the organization named "3rd Generation Partnership Project" (3GPP). The CDMA2000 and UMB are cited from descriptions of the documentation of the organization named "3rd Generation Partnership Project 2" (3GPP2). Techniques described in this specification may be used in the aforementioned systems and radio technologies, and can also be used in other systems and radio technologies. However, the following descriptions describe the new radio (NR) system for exemplary purposes, and most of the following descriptions use NR terms. Those skilled in the art can understand that the embodiments are only examples and do not constitute any limitations. The technical solutions in the embodiments of this disclosure may also be applied to applications other than those of the NR system.

A wireless communications system included in the embodiments of this disclosure includes a terminal and a network device. The terminal may also be referred to as a terminal device or user equipment (UE). The terminal may be a terminal-side device such as a mobile phone, a tablet computer (Tablet Personal Computer), a laptop computer, a personal digital assistant (PDA), a mobile Internet device (MID), a wearable device, or an in-vehicle device. It should be noted that a specific type of the terminal is not limited in the embodiments of this disclosure. The network device may be a base station or a core network. The base station may be a 5G base station and a base station of a later version (for example, a gNB or a 5G NR NB), or a base station in another communications system (for example, an eNB, a wireless local area network (WLAN) access point, or another access point). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specific technical term.

In the embodiments of this disclosure, a downlink transmission set is optionally a PDSCH set, and a downlink transmission group is optionally a PDSCH group. It should be noted that, in the following descriptions of this disclosure, some embodiments are described by using the PDSCH set and/or PDSCH group as an example. However, this is not limited thereto.

Figure 1:
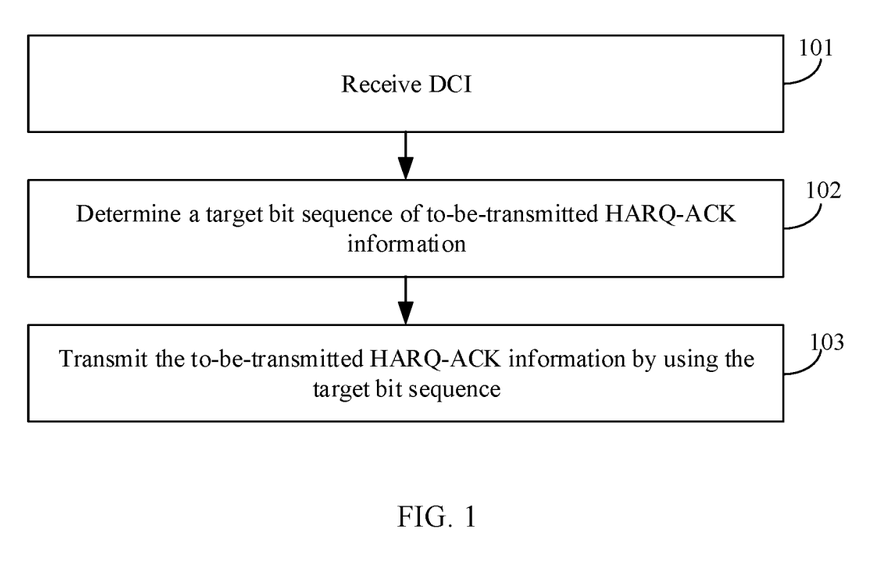
FIG. 1 is a flowchart of an information transmission method according to an embodiment of this disclosure.

Referring to FIG. 1, FIG. 1 is a flowchart of an information transmission method according to an embodiment of this disclosure. The method is applied to a terminal. As shown in FIG. 1, the method includes the following steps.

Step 101: Receive DCI.

In this embodiment, the DCI received in this step may be understood as a DCI set, and the DCI set may include a single piece of DCI or a plurality of pieces of DCI.

Step 102: Determine a target bit sequence of to-be-transmitted HARQ-ACK information.

The to-be-transmitted HARQ-ACK information includes first information, and the first information is HARQ-ACK information that has not been successfully reported before and that is triggered by the DCI. Further, the to-be-transmitted HARQ-ACK information may further include second information, and the second information is HARQ-ACK information for a downlink transmission scheduled by the DCI, that is, HARQ-ACK information for a newly scheduled downlink transmission. The downlink transmission is optionally a PDSCH transmission and/or a semi-persistent scheduling (SPS) PDSCH release indication procedure.

It can be understood that, in a case that a plurality of pieces of DCI are received, the trigger information may be included in part of the DCI. The trigger information is used to trigger transmission of the HARQ-ACK information that has not been successfully reported before the trigger. The other part of the DCI includes scheduling information, and the scheduling information is used to schedule a new downlink transmission.

In an implementation, a single piece of DCI may include both the trigger information and the scheduling information. The trigger information is used to trigger transmission of the HARQ-ACK information that has not been successfully reported before the trigger, and the scheduling information is used to schedule a new downlink transmission.

Step 103: Transmit the to-be-transmitted HARQ-ACK information by using the target bit sequence.

According to the information transmission method in this embodiment of this disclosure, in a case that the network device triggers or requests the terminal to report the HARQ-ACK information, the terminal can effectively transmit the to-be-transmitted HARQ-ACK information that has not been successfully reported before, thereby ensuring a feedback effect.

In this embodiment of this disclosure, optionally, in order to determine the target bit sequence of the to-be-transmitted HARQ-ACK information, a corresponding target bit sequence may be determined based on downlink assignment index (DAI) numbers of downlink transmissions corresponding to the to-be-transmitted HARQ-ACK information. For example, based on a dynamic codebook (Type-2) mechanism in NR Rel-15, a DAI counting range is extended by including, in the DAI counting range, all downlink transmissions corresponding to the HARQ-ACK information that needs to be reported on a same PUCCH resource. The downlink transmission is optionally a PDSCH transmission and/or an SPS PDSCH release indication procedure.

Optionally, step 102 may include:
  determining DAI numbers of the downlink transmissions corresponding to the to-be-transmitted HARQ-ACK information, where each of the downlink transmissions corresponding to the to-be-transmitted HARQ-ACK information has one DAI number; and
  determining the target bit sequence of the to-be-transmitted HARQ-ACK information based on the DAI numbers of the downlink transmissions corresponding to the to-be-transmitted HARQ-ACK information.

It should be noted that a manner of determining the target bit sequence based on the DAI number herein may use a manner in the related art, such as a manner in NR Rel-15. This is not limited in this embodiment of this disclosure.

In this embodiment, for a scheme of explicitly requesting for or triggering the HARQ-ACK information that has not been successfully reported before, when scheduling a specific PDSCH transmission, the network device may determine a PDSCH group corresponding to the PDSCH transmission, that is, in a dynamic PDSCH group manner. Each PDSCH group corresponds to a unique index or number and corresponds to a series of (one or more) scheduled PDSCH transmissions; and may also involve a single SPS PDSCH release indication. One or more PDSCH groups may correspond to one PDSCH set. Downlink transmissions in the PDSCH set may be construed as all PDSCH transmissions and SPS PDSCH release indications corresponding to a single explicit requesting or triggering.

After the DAI counting range is extended, all the downlink transmissions (including those newly scheduled and subsequently triggered) for which the HARQ-ACK information needs to be reported on the same PUCCH resource may be included in a single DAI number range. To be specific, before a modulo operation on the DAI number range, numbering starts from a smallest DAI value (which is optionally 1) until all the downlink transmissions for which the HARQ-ACK information needs to be reported on the same PUCCH resource are numbered, where adjacent DAI numbers are contiguous.

Based on the foregoing content, during determining of the DAI numbers of the downlink transmissions before the modulo operation, a position of each PDSCH group or a specific downlink transmission in a specific PDSCH group within the single DAI number range needs to be mainly considered; and values of the DAI numbers before the modulo operation and corresponding to the downlink transmissions in each PDSCH group are determined based on the determined position. Such DAI numbers before the modulo operation need to be consistent between the network device side and the terminal side. When the DAI numbers need to be notified between two sides by using signaling (in most cases, the network device notifies the terminal by using DCI), a modulo operation is performed on the corresponding DAI numbers, and a corresponding modulo result is indicated by using a DCI field.

In an implementation, the to-be-transmitted HARQ-ACK information is transmitted on a same uplink resource, and the DAI numbers of the downlink transmissions corresponding to the to-be-transmitted HARQ-ACK information are contiguous before a modulo operation and increment sequentially from a smallest DAI number.

Optionally, the DAI numbers of the downlink transmissions corresponding to the to-be-transmitted HARQ-ACK information may be any one of the following:

(1) DAI numbers that are determined based on an order of triggering time for the first information For a PDSCH group for which reporting of the corresponding HARQ-ACK information is explicitly triggered, a relative position of a DAI number range corresponding to the PDSCH group within the entire DAI number range may be determined based on a transmission time (which is a triggering time, for example, a transmission time of the last trigger signaling for triggering the PDSCH group) of trigger signaling. For a downlink transmission (a PDSCH transmission and/or SPS PDSCH release indication procedure) for which reporting of the corresponding HARQ-ACK information is explicitly triggered, a relative position of a DAI number corresponding to the downlink transmission within the entire DAI number range may be determined based on a transmission time (which is a triggering time) of trigger signaling.

When triggering is performed for a plurality of PDSCH groups by using a single piece of trigger signaling, an order of the plurality of PDSCH groups may be determined in any one of the following manners:

Manner 1: The order of the plurality of PDSCH groups is indicated in the trigger signaling.

Manner 2: Numbers of the PDSCH groups are in an ascending order.

In addition, for a specific PDSCH group, if triggering is performed for a plurality of times, a time of the last triggering is used.

(2) DAI numbers that are determined based on an order of scheduling time for downlink transmissions corresponding to the first information In this case, only scheduling time for corresponding downlink transmissions are considered, and a triggering time for subsequently triggering reporting of the HARQ-ACK information is not considered. To be specific, if the HARQ-ACK information corresponding to scheduled downlink transmissions is reported on the same PUCCH resource, regardless of whether the HARQ-ACK information corresponding to these downlink transmissions is triggered by subsequent explicit signaling after the scheduling, relative positions of the downlink transmissions within the entire DAI number range are determined sequentially based on (original) the time of scheduling the downlink transmissions. When a plurality of downlink transmissions are scheduled at a single scheduling time, an order of the plurality of downlink transmissions may be determined based on an ascending order of DAI values before a modulo operation that are determined during scheduling of the plurality of downlink transmissions.

(3) DAI numbers that are determined based on an ascending order of numbers of downlink transmission groups The first information corresponds to at least one first downlink transmission group, each first downlink transmission group has one serial number, and an order of DAI numbers of downlink transmissions in each first downlink transmission group is determined based on a scheduling order; and DAI numbers corresponding to downlink transmission groups with adjacent numbers are contiguous before a modulo operation.

Assuming that downlink transmissions are organized based on downlink transmission groups such as PDSCH groups, a PDSCH group to which the downlink transmissions belong may be indicated in scheduling signaling for the downlink transmissions, or the PDSCH group to which the downlink transmissions belong may be determined according to some predefined rules. Each PDSCH group corresponds to one number or index. During determining of a relative position of each downlink transmission in each DSCH group within the entire DAI number range, a relative position of each PDSCH group within the entire DAI number range may be first determined based on an ascending order of numbers of the PDSCH groups, and then a relative position of each downlink transmission in a DAI number subrange corresponding to a corresponding PDSCH group is determined based on a DAI order (for example, based on the DAI values before the modulo operation) that is indicated during scheduling of the downlink transmissions in each PDSCH group, so as to determine the relative position of each downlink transmission in the PDSCH group within the entire DAI number range.

Optionally, in a case that the to-be-transmitted HARQ-ACK information includes both the first information and the second information, the DAI numbers of the downlink transmissions corresponding to the to-be-transmitted HARQ-ACK information may be any one of the following:

(1) DAI numbers that are determined based on an order of a triggering time for the first information and a scheduling time for a downlink transmission corresponding to the second information For a PDSCH group for which reporting of the corresponding HARQ-ACK information is explicitly triggered, a relative position of a DAI number range corresponding to the PDSCH group within the entire DAI number range may be determined based on a transmission time (which is a triggering time, for example, a transmission time of the last trigger signaling for triggering the PDSCH group) of trigger signaling. For a downlink transmission (a PDSCH transmission and/or SPS PDSCH release indication procedure) for which reporting of the corresponding HARQ-ACK information is explicitly triggered, a relative position of a DAI number corresponding to the downlink transmission within the entire DAI number range may be determined based on a transmission time (which is a triggering time) of trigger signaling. In addition, for a newly scheduled downlink transmission (a PDSCH transmission and/or SPS PDSCH release indication procedure), a relative position of a DAI number corresponding to the downlink transmission within the entire DAI number range is determined based on a scheduling time. In a case that a single piece of DCI includes both the trigger information and the scheduling information, for each PDSCH group actually triggered by the trigger information (to be specific, after the DCI and before reporting of the corresponding HARQ-ACK information, the PDSCH group is no longer explicitly triggered by trigger information in other DCI), a relative position of a DAI number range corresponding to the PDSCH group within the entire DAI number range may be first determined based on a triggering time (which is a current DCI transmission time) in a specific manner described above in which an order of a plurality of PDSCH groups is determined when the plurality of PDSCH groups are triggered by a single piece of trigger signaling. Then, for a newly scheduled downlink transmission (including a PDSCH transmission and/or SPS PDSCH release indication procedure, where an explicit trigger operation is not involved), a relative position of a DAI number corresponding to the downlink transmission within the entire DAI number range is determined based on a scheduling time (which is a current DCI transmission time). In other words, the trigger information in the DCI is first considered, and then the scheduling information in the DCI is considered.

In a specific implementation, the network device such as a gNB may make downlink transmissions in a PDSCH set corresponding to each piece of trigger information (including one or more PDSCH groups, in which case a PDSCH group indicated by trigger information transmitted after this trigger information may be excluded and only downlink transmissions corresponding to the remaining zero, one, or more PDSCH groups are considered to form such PDSCH set) correspond to independent and contiguous DAI numbers. These numbers are contiguous with DAI numbers corresponding to new downlink transmissions scheduled before or after the trigger information (for example, in a case that the same DCI includes the trigger information and also schedules new downlink transmissions). The DAI numbers of the downlink transmissions corresponding to the HARQ-ACK information transmitted on the same PUCCH resource may be contiguous before the modulo operation, and increment sequentially from the smallest DAI number (which is optionally, for example, 1). In this way, the terminal may determine a feedback bit sequence (which is a HARQ-ACK Codebook) based on a reception status of a HARQ-ACK or SPS PDSCH release indication for PDSCH transmissions corresponding to DAI numbers.

Figure 2:
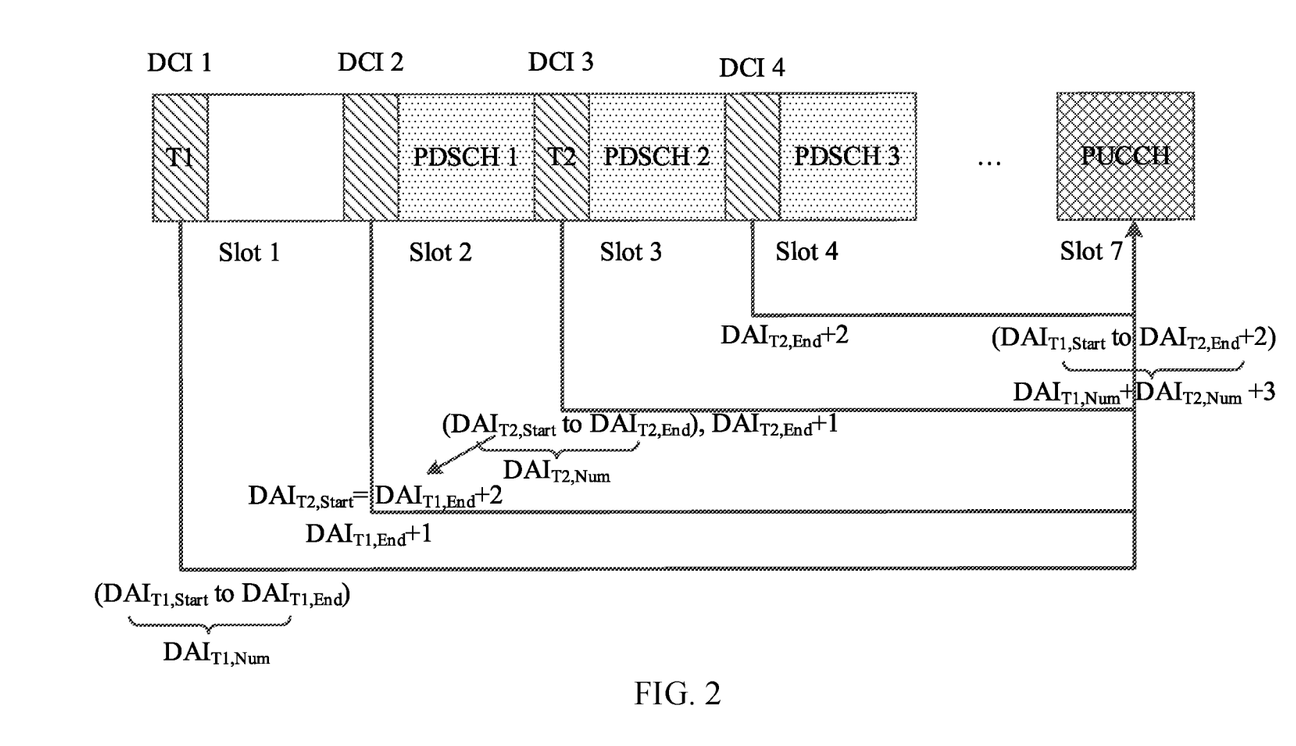
FIG. 2 is a schematic diagram of counting DAI numbers of PDSCH transmissions in a specific example of this disclosure.

For example, as shown in FIG. 2, if the gNB uses DCI1 (including trigger information 1) in slot 1 (Slot1) to trigger reporting of HARQ-ACK information corresponding to PDSCH set 1 in slot 7, a DAI number range of PDSCH transmissions in PDSCH set 1 is $DAI_{T1,start}$ to $DAI_{T1,End}$, and a corresponding quantity of DAI numbers is $DAI_{T1,Num}$. In slot 2, the gNB uses conventional DCI2 to schedule PDSCH1 transmission, HARQ-ACK information corresponding to the PDSCH1 transmission is to be reported in slot 7, and a DAI number of the PDSCH1 transmission is $DAI_{T1,End}+1$. In slot 3, the gNB uses DCI3 (including trigger information 2) to trigger reporting of HARQ-ACK information corresponding to PDSCH set 3 in slot 7, and a DAI number range of PDSCH transmissions in the PDSCH set 3 is $DAI_{T2,start}$ to $DAI_{T2,End}$, where the $DAI_{T2,start}$ is equal to $DAI_{T1,End}+2$, and a corresponding quantity of DAI numbers is $DAI_{T2,Num}$; and the gNB schedules PDSCH2 transmission, HARQ-ACK information corresponding to the PDSCH2 transmission is to be reported in slot 7, and a DAI number of the PDSCH2 transmission is $DAI_{T2,End}+1$. In slot 4, the gNB uses conventional DCI4 to schedule PDSCH3 transmission, HARQ-ACK information corresponding to the PDSCH3 transmission is to be reported in slot 7, and a DAI number of the PDSCH3 transmission is $DAI_{T2,End}+4$. In this case, a DAI number range of the PDSCH transmissions corresponding to the HARQ-ACK information to be reported in slot 7 is $DAI_{T1,Start}$ to $DAI_{T2,End}+2$, and a corresponding quantity of DAI numbers is $DAI_{T1,Num}+DAI_{T2,Num}$. The foregoing PDSCH1 transmission, PDSCH2 transmission, and PDSCH3 transmission may belong to a same PDSCH group, which may be indicated in scheduling information of corresponding DCI.

(2) DAI numbers that are determined based on an order of scheduling time for downlink transmissions that are corresponding to the first information and the second information In this case, only scheduling time for corresponding downlink transmissions are considered, and a triggering time for subsequently triggering reporting of the HARQ-ACK information is not considered. To be specific, if the HARQ-ACK information corresponding to scheduled downlink transmissions is reported on the same PUCCH resource, regardless of whether the HARQ-ACK information corresponding to these downlink transmissions is triggered by subsequent explicit signaling after the scheduling, relative positions of the downlink transmissions within the entire DAI number range are determined sequentially based on (original) the time of scheduling the downlink transmissions.

(3) DAI numbers that are determined based on an ascending order of numbers of downlink transmission groups The first information corresponds to at least one first downlink transmission group, each first downlink transmission group has one serial number, and an order of DAI numbers of downlink transmissions in each first downlink transmission group is determined based on a scheduling order; the second information corresponds to at least one second downlink transmission group, each second downlink transmission group has one serial number, and an order of DAI numbers of downlink transmissions in each second downlink transmission group is determined based on a scheduling order; and DAI numbers corresponding to downlink transmission groups with adjacent numbers are contiguous before a modulo operation.

It can be understood that adjacently numbered downlink transmission groups in this manner may be two first downlink transmission groups that are adjacently numbered, or two second downlink transmission groups that are adjacently numbered, or a first downlink transmission group and second downlink transmission group that are adjacently numbered.

In an implementation, the second downlink transmission group may be separately processed, instead of being processed along with the first downlink transmission group based on an ascending order of group numbers. A specific processing procedure may be as follows: First determine DAI numbers of all involved first downlink transmission groups based on an ascending order of the numbers of the downlink transmission groups, and then place DAI numbers of downlink transmissions in the second downlink transmission group at the end. In a case that a plurality of second downlink transmission groups are involved, DAI numbers of all the involved second downlink transmission groups may be processed based on an ascending order of numbers of the second downlink transmission groups.

Optionally, when the to-be-transmitted HARQ-ACK information includes the second information and the DAI numbers of the downlink transmissions corresponding to the to-be-transmitted HARQ-ACK information are determined based on an ascending order of the numbers of the downlink transmission groups, the DAI numbers corresponding to the at least one second downlink transmission group are located at the end part of all DAI numbers (that is, the end part with a largest-value subrange before the modulo operation). The relative positions between the downlink transmissions in each second downlink transmission group may be determined based on scheduling time or a DAI order (for example, DAI values before the modulo operation) indicated during the scheduling.

In this embodiment of this disclosure, the network device performs DAI counting based on a scheduling status, so as to avoid inconsistent understanding between two sides on a quantity of bits included in the HARQ-ACK codebook (HARQ-ACK Codebook Size) and downlink transmissions corresponding to the bits due to missed detection on some DCI by the terminal. In order to further improve the robustness, the network device may further indicate, in the trigger information, its corresponding PDSCH set or a quantity of DAI numbers occupied by each corresponding PDSCH group. In addition, in order to ensure that the network device side and the terminal side have consistent understanding on the DAI number range corresponding to the trigger information in case of missed detection on DCI by the terminal, a corresponding start DAI number and/or end DAI number may be further indicated in the trigger information.

Optionally, the first information corresponds to at least one first downlink transmission set, each first downlink transmission set corresponds to at least one first downlink transmission group, and each first downlink transmission set corresponds to one trigger process. The DCI includes at least one piece of trigger information, each piece of trigger information is transmitted for one trigger process, each piece of trigger information includes first indication information, and the first indication information is used to indicate any one of the following:
a quantity of DAI numbers occupied by a corresponding first downlink transmission set; and
a quantity of DAI numbers occupied by each corresponding first downlink transmission group.

Further, the first indication information is further used to indicate any one of the following:
a start DAI number of a corresponding first downlink transmission set;
a start DAI number of each corresponding first downlink transmission group;
an end DAI number of a corresponding first downlink transmission set; and
an end DAI number of each corresponding first downlink transmission group.

In this embodiment of this disclosure, when corresponding HARQ-ACK information for one or more scheduled downlink transmissions (including PDSCH transmission and/or SPS PDSCH release indication) are reported on the same single PUCCH resource (at a same time-domain position), a feedback bit sequence of such HARQ-ACK information may be used as a single HARQ-ACK codebook. In addition, the network device may alternatively trigger the terminal to transmit, on the single PUCCH resource, one or more HARQ-ACK codebooks that are supposed, based on a scheduling time sequence, to be reported before on a specific PUCCH resource but have not actually been successfully transmitted, or one or more HARQ-ACK codebooks that have been triggered before but have not actually been successfully transmitted. In this case, the terminal needs to transmit one or more HARQ-ACK codebooks on the single PUCCH resource indicated by the network device. Each HARQ-ACK codebook may be determined based on the scheduling time sequence (generally, only one of such codebooks can be transmitted on a single PUCCH resource) or may be triggered. If the HARQ-ACK bit sequences transmitted on the single PUCCH resource are used as a single HARQ-ACK codebook after merging, each HARQ-ACK codebook before merging may be used as a HARQ-ACK sub-codebook to be merged. During construction of a specific HARQ-ACK sub-codebook, a semi-static codebook (Type-1) or dynamic codebook (Type-2) specified by NR Rel-15 may be used.

For a plurality of HARQ-ACK sub-codebooks to be reported on the same PUCCH resource, one type of target bit sequence is implemented as follows: sequentially concatenating the bit sequences corresponding to the HARQ-ACK sub-codebooks, to form a feedback bit sequence.

Optionally, in a case that the first information corresponds to at least one first downlink transmission set, each first downlink transmission set corresponds to one trigger process, each first downlink transmission set corresponds to at least one HARQ-ACK sub-codebook, each HARQ-ACK sub-codebook has one index value, and the index values of the HARQ-ACK sub-codebooks are different, the target bit sequence may include any one of the following:
bit sequences of HARQ-ACK sub-codebooks corresponding to index values, where the bit sequences are concatenated based on an ascending order of the index values, and index values of a plurality of HARQ-ACK sub-codebooks may be contiguous or noncontiguous; and
bit sequences of HARQ-ACK sub-codebooks, where the bit sequences are concatenated based on an order of triggering times for the first information, and optionally, when a plurality of HARQ-ACK sub-codebooks are triggered at a single triggering time, the bit sequences of these HARQ-ACK sub-codebooks may be concatenated based on an ascending order of index values.

Optionally, in a case that the to-be-transmitted HARQ-ACK information includes both the first information and the second information, when the first information corresponds to at least one first downlink transmission set, each first downlink transmission set corresponds to one trigger process, and each first downlink transmission set corresponds to at least one HARQ-ACK sub-codebook; and the second information corresponds to at least one second downlink transmission set (the second downlink transmission set may include one or more scheduled downlink transmissions and a plurality of scheduled downlink transmissions may be scheduled by using a plurality of pieces of DCI that includes scheduling information), each second downlink transmission set corresponds to one HARQ-ACK sub-codebook, and index values of the HARQ-ACK sub-codebooks are different, the target bit sequence may include any one of the following:

bit sequences of HARQ-ACK sub-codebooks corresponding to index values, where the bit sequences are concatenated based on an ascending order of the index values, and index values of a plurality of HARQ-ACK sub-codebooks may be contiguous or noncontiguous; and bit sequences of HARQ-ACK sub-codebooks, where the bit sequences are concatenated based on an order of a triggering time for the first information and a scheduling time for a downlink transmission corresponding to the second information; optionally, when a plurality of HARQ-ACK sub-codebooks are triggered at a single triggering time, bit sequences of these HARQ-ACK sub-codebooks may be concatenated based on an ascending order of index values; and optionally, when a specific second downlink transmission set corresponding to the second information includes a plurality of downlink transmissions, a scheduling time of a downlink transmission with the last scheduling time may be used.

It can be understood that, in this solution, for a single downlink transmission set (which is a single first downlink transmission set or a single second downlink transmission set), HARQ-ACK information corresponding to downlink transmissions in the downlink transmission set is transmitted on the same uplink resource. When a dynamic codebook is used, each downlink transmission set may correspond to one or more downlink transmission groups, and DAI numbers may be accumulated independently in each downlink transmission group, with no need to form one same DAI number range. In other words, DAI numbers (before the modulo operation) may be valid and unique within a DAI number range corresponding to each downlink transmission group. Optionally, when a dynamic codebook is used, second downlink transmission sets are in one-to-one correspondence to downlink transmission groups.

Figure 3:
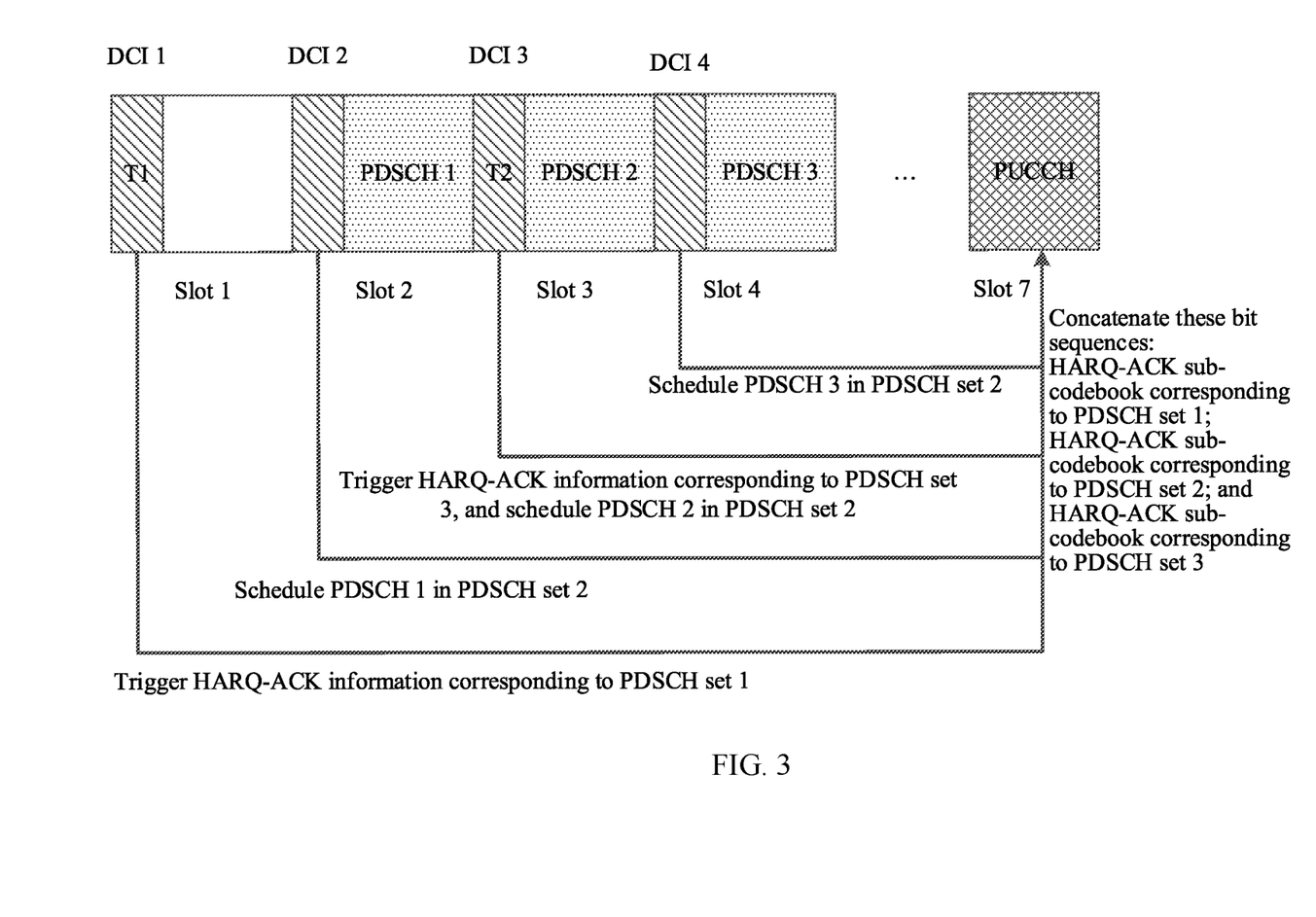
FIG. 3 is a schematic diagram of concatenating HARQ-ACK sub-codebooks corresponding to PDSCH sets in a specific example of this disclosure.

For example, as shown in FIG. 3, if the gNB uses DCI1 (including trigger information) in slot 1 to trigger reporting of HARQ-ACK information corresponding to PDSCH set 1 in slot 7, the PDSCH set 1 corresponds to a single HARQ-ACK sub-codebook, with an index value of 1. If the gNB uses DCI3 (including trigger information) in slot 3 to trigger reporting of HARQ-ACK information corresponding to PDSCH set 3 in slot 7, the PDSCH set 3 corresponds to a single HARQ-ACK sub-codebook, with an index value of 3. If the gNB uses DCI2 in slot 2 to schedule PDSCH1 transmission belonging to PDSCH set 2, uses DCI3 in slot 3 to schedule PDSCH2 transmission belonging to PDSCH set 2, and uses DCI4 in slot 4 to schedule PDSCH3 transmission belonging to PDSCH set 2, and the PDSCH set 2 corresponds to a single HARQ-ACK sub-codebook, with an index value of 2. In this case, the target bit sequence of the HARQ-ACK information to be reported in slot 7 includes the following bit sequences concatenated based on an ascending order of the index values: a bit sequence of the HARQ-ACK sub-codebook corresponding to the PDSCH set 1, a bit sequence of the HARQ-ACK sub-codebook corresponding to the PDSCH set 2, and a bit sequence of HARQ-ACK sub-codebook corresponding to the PDSCH set 3.

Further, in a case that the to-be-transmitted HARQ-ACK information includes the second information, that is, there is a HARQ-ACK sub-codebook corresponding to a newly scheduled downlink transmission, during obtaining of the target bit sequence through concatenation, the HARQ-ACK sub-codebook may be explicitly placed before or after all other HARQ-ACK sub-codebooks, that is, the HARQ-ACK sub-codebook corresponding to the at least one second downlink transmission set is located at the start or end part of the target bit sequence.

Optionally, the target bit sequence may include indicator bits, and the indicator bits are used to indicate index values of concatenated HARQ-ACK sub-codebooks in the target bit sequence, so as to improve flexibility and robustness. For example, in a specific implementation, for the target bit sequence, before the bit sequences corresponding to the HARQ-ACK sub-codebooks are concatenated, the indicator bits may be added (it needs to be ensured that a quantity of bits is sufficient to indicate all index values that may need to be indicated; reference may be made to a quantity of bits and value settings in the DCI), so as to explicitly indicate the index values of the corresponding HARQ-ACK sub-codebooks.

In this embodiment of this disclosure, in order to avoid inconsistent understanding on a HARQ-ACK sub-codebook corresponding to some or a specific index value between the network device side and the terminal side (for example, when a dynamic codebook is used, if the terminal misses detection on all DCI in the last slot, inconsistent understanding on a codebook size between two sides may be resulted), a length indication for each HARQ-ACK sub-codebook may be provided based on a concatenating order before the bit sequences corresponding to the HARQ-ACK sub-codebooks are concatenated. Further, before a length of each HARQ-ACK sub-codebook is indicated, the index value of the corresponding HARQ-ACK sub-codebook may alternatively be first indicated.

Optionally, the method further includes:
transmitting second indication information to the network device, where
the second indication information is used to indicate a length of each HARQ-ACK sub-codebook based on a concatenating order of the target bit sequence.

In this way, with the second indication information, inconsistent understanding on a HARQ-ACK sub-codebook corresponding to some or a specific index value between the network device side and the terminal side can be avoided.

Optionally, the method further includes:
transmitting third indication information to the network device, where
the third indication information is used to indicate an index value of each HARQ-ACK sub-codebook based on a concatenating order of the target bit sequence.

In this way, with the third indication information, inconsistent understanding on a HARQ-ACK sub-codebook corresponding to some or a specific index value between the network device side and the terminal side can be avoided.

In a specific implementation, the second indication information and the third indication information may be transmitted separately, or may be combined into one piece of indication information for transmission together.

In this embodiment of this disclosure, in a case that the HARQ-ACK information is reported by using the HARQ-ACK sub-codebook, information indicated by bits in some HARQ-ACK sub-codebooks may have expired, and then may be overwritten by bits, pointing to a same HARQ process, in a subsequent HARQ-ACK sub-codebook. For example, in a scenario in which retransmission is scheduled in advance, a HARQ-ACK bit corresponding to a specific HARQ process may be presented in two or more HARQ-ACK sub-codebooks; in this case, only the most recently set HARQ-ACK bit (corresponding to the latest decoding result) has reference significance for network device, and a previously set HARQ-ACK bit has become invalid. In addition, when missed detection on DCI occurs, the terminal may not know which HARQ process the missed DCI corresponds to, and therefore cannot accurately determine a redundant bit of the HARQ process, that is, cannot accurately identify redundant bits between all HARQ-ACK sub-codebooks.

Considering inaccurate determining of redundant bits by the terminal, based on the target bit sequence formed by concatenated bits of the HARQ-ACK sub-codebook, a length of the target bit sequence can be further optimized to control a length of an actually transmitted HARQ-ACK bit sequence.

Optionally, when a quantity of bits of the target bit sequence exceeds a preset ratio of a quantity of all current HARQ processes, before step 103, the method further includes:

determining a to-be-actually-transmitted HARQ-ACK bit sequence, where a quantity of bits of the to-be-actually-transmitted HARQ-ACK bit sequence is less than or equal to the quantity of all the current HARQ processes.

The foregoing step 103 may include: transmitting HARQ-ACK information of all the current HARQ processes by using the to-be-actually-transmitted HARQ-ACK bit sequence.

All the current HARQ processes may be prescribed by a protocol or configured. The preset ratio may be configured in advance or prescribed by the protocol.

For example, when the terminal determines that a quantity of bits that need to be reported on a single carrier exceeds the quantity of HARQ processes on the single carrier, or exceeds a specific proportion (which may be configured in advance or prescribed by the protocol) of the quantity of HARQ processes on the single carrier, the terminal may control the length of the to-be-actually-transmitted HARQ-ACK bit sequence and directly report HARQ-ACK information of all HARQ processes. Feedback bits corresponding to the HARQ processes on the carrier may be arranged based on process IDs in a bitmap manner. For a HARQ process whose corresponding DCI has been detected by the terminal, the terminal may use a decoding result corresponding to the last PDSCH transmission occupying the HARQ process. For a HARQ process whose corresponding DCI has not been detected by the terminal, the terminal may set a negative acknowledgement (NACK), or use a decoding result corresponding to a transmission (not included in a current triggered feedback range) before the HARQ process.

The foregoing embodiment describes the information transmission method of this disclosure, and the following describes the terminal of this disclosure with reference to embodiments and accompanying drawings.

Figure 4:
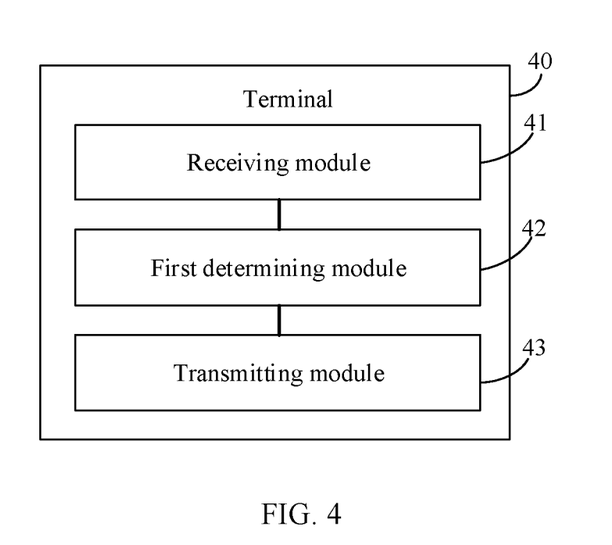
FIG. 4 is a first schematic structural diagram of a terminal according to an embodiment of this disclosure.

Referring to FIG. 4, FIG. 4 is a schematic structural diagram of a terminal according to an embodiment of this disclosure. As shown in FIG. 4, the terminal 40 includes:
a receiving module 41, configured to receive DCI;
a first determining module 42, configured to determine a target bit sequence of to-be-transmitted HARQ-ACK information, where the to-be-transmitted HARQ-ACK information includes first information, and the first information is HARQ-ACK information that has not been successfully reported before and that is triggered by the DCI; and
a transmitting module 43, configured to transmit the to-be-transmitted HARQ-ACK information by using the target bit sequence.

The terminal in this embodiment of this disclosure can determine a feedback bit sequence of the to-be-transmitted HARQ-ACK information and effectively transmit the to-be-transmitted HARQ-ACK information in a case that the network device triggers or requests the terminal to report the HARQ-ACK information that has not been successfully reported before, thereby ensuring a feedback effect.

In this embodiment of this disclosure, optionally, the first determining module 42 includes:
a first determining unit, configured to determine DAI numbers of downlink transmissions corresponding to the to-be-transmitted HARQ-ACK information, where each of the downlink transmissions corresponding to the to-be-transmitted HARQ-ACK information has one DAI number; and
a second determining unit, configured to determine the target bit sequence of the to-be-transmitted HARQ-ACK information based on the DAI numbers of the downlink transmissions corresponding to the to-be-transmitted HARQ-ACK information.

Optionally, the DAI numbers of the downlink transmissions corresponding to the to-be-transmitted HARQ-ACK information are any one of the following:
DAI numbers that are determined based on an order of triggering time for the first information;
DAI numbers that are determined based on an order of scheduling time for downlink transmissions corresponding to the first information; and
DAI numbers that are determined based on an ascending order of numbers of downlink transmission groups, where the first information corresponds to at least one first downlink transmission group, each first downlink transmission group has one serial number, and an order of DAI numbers of downlink transmissions in each first downlink transmission group is determined based on a scheduling order; and DAI numbers corresponding to downlink transmission groups with adjacent numbers are contiguous before a modulo operation.

Optionally, the to-be-transmitted HARQ-ACK information is transmitted on a same uplink resource, and the DAI numbers of the downlink transmissions corresponding to the to-be-transmitted HARQ-ACK information are contiguous before a modulo operation and increment sequentially from a smallest DAI number.

Optionally, the to-be-transmitted HARQ-ACK information further includes second information, and the second information is HARQ-ACK information for a downlink transmission scheduled by the DCI.

Further, the DAI numbers of the downlink transmissions corresponding to the to-be-transmitted HARQ-ACK information are any one of the following:

DAI numbers that are determined based on an order of a triggering time for the first information and a scheduling time for a downlink transmission corresponding to the second information; and DAI numbers that are determined based on an order of scheduling time for downlink transmissions that are corresponding to the first information and the second information; and DAI numbers that are determined based on an ascending order of numbers of downlink transmission groups; where the first information corresponds to at least one first downlink transmission group, each first downlink transmission group has one serial number, and an order of DAI numbers of downlink transmissions in each first downlink transmission group is determined based on a scheduling order; the second information corresponds to at least one second downlink transmission group, each second downlink transmission group has one serial number, and an order of DAI numbers of downlink transmissions in each second downlink transmission group is determined based on a scheduling order; and DAI numbers corresponding to downlink transmission groups with adjacent numbers are contiguous before a modulo operation.

Optionally, in a case that the DAI numbers of the downlink transmissions corresponding to the to-be-transmitted HARQ-ACK information are determined based on an ascending order of the numbers of the downlink transmission groups, and DAI numbers corresponding to the at least one second downlink transmission group are located at the end part of all DAI numbers.

Optionally, the first information corresponds to at least one first downlink transmission set, each first downlink transmission set corresponds to at least one first downlink transmission group, and each first downlink transmission set corresponds to one trigger process; and the DCI includes at least one piece of trigger information, each piece of trigger information is transmitted for one trigger process, each piece of trigger information includes first indication information, and the first indication information is used to indicate any one of the following:

a quantity of DAI numbers occupied by a corresponding first downlink transmission set; and a quantity of DAI numbers occupied by each corresponding first downlink transmission group.

Optionally, the first indication information is further used to indicate any one of the following:

a start DAI number of a corresponding first downlink transmission set;

a start DAI number of each corresponding first downlink transmission group;

an end DAI number of a corresponding first downlink transmission set; and an end DAI number of each corresponding first downlink transmission group.

Optionally, the first information corresponds to at least one first downlink transmission set, each first downlink transmission set corresponds to one trigger process, each first downlink transmission set corresponds to at least one HARQ-ACK sub-codebook, and each HARQ-ACK sub-codebook has one index value.

The target bit sequence includes any one of the following:
bit sequences of HARQ-ACK sub-codebooks corresponding to index values, where the bit sequences are concatenated based on an ascending order of the index values; and bit sequences of HARQ-ACK sub-codebooks, where the bit sequences are concatenated based on an order of triggering times for the first information.

Optionally, the first information corresponds to at least one first downlink transmission set, each first downlink transmission set corresponds to one trigger process, and each first downlink transmission set corresponds to at least one HARQ-ACK sub-codebook; and the second information corresponds to at least one second downlink transmission set, each second downlink transmission set corresponds to one HARQ-ACK sub-codebook, and each HARQ-ACK sub-codebook has one index value.

The target bit sequence includes any one of the following:
bit sequences of HARQ-ACK sub-codebooks corresponding to index values, where the bit sequences are concatenated based on an ascending order of the index values; and bit sequences of HARQ-ACK sub-codebooks, where the bit sequences are concatenated based on an order of a triggering time for the first information and a scheduling time for a downlink transmission corresponding to the second information.

Optionally, a HARQ-ACK sub-codebook corresponding to the at least one second downlink transmission set is located at the start or end part of the target bit sequence.

Optionally, the target bit sequence includes indicator bits, and the indicator bits are used to indicate index values of concatenated HARQ-ACK sub-codebooks in the target bit sequence.

Optionally, the terminal further includes:
a first transmitting module, configured to transmit second indication information to a network device, where
the second indication information is used to indicate a length of each HARQ-ACK sub-codebook based on a concatenating order of the target bit sequence.

Optionally, the terminal further includes:
a second transmitting module, configured to transmit third indication information to a network device, where
the third indication information is used to indicate an index value of each HARQ-ACK sub-codebook based on a concatenating order of the target bit sequence.

Optionally, when a quantity of bits of the target bit sequence exceeds a preset ratio of a quantity of all current HARQ processes, the terminal further includes:
a second determining module, configured to determine a to-be-actually-transmitted HARQ-ACK bit sequence, where a quantity of bits of the to-be-actually-transmitted HARQ-ACK bit sequence is less than or equal to the quantity of all the current HARQ processes; and
the transmitting module is specifically configured to:
transmit HARQ-ACK information of all the current HARQ processes by using the to-be-actually-transmitted HARQ-ACK bit sequence.

Optionally, all the current HARQ processes are prescribed by a protocol or configured.

An embodiment of this disclosure further provides a terminal, including a processor, a memory, and a computer program stored in the memory and capable of running on the processor. When the computer program is executed by the processor, the processes of the foregoing embodiment of the information transmission method are implemented, with the same technical effects achieved. To avoid repetition, details are not described herein again.

Figure 5:
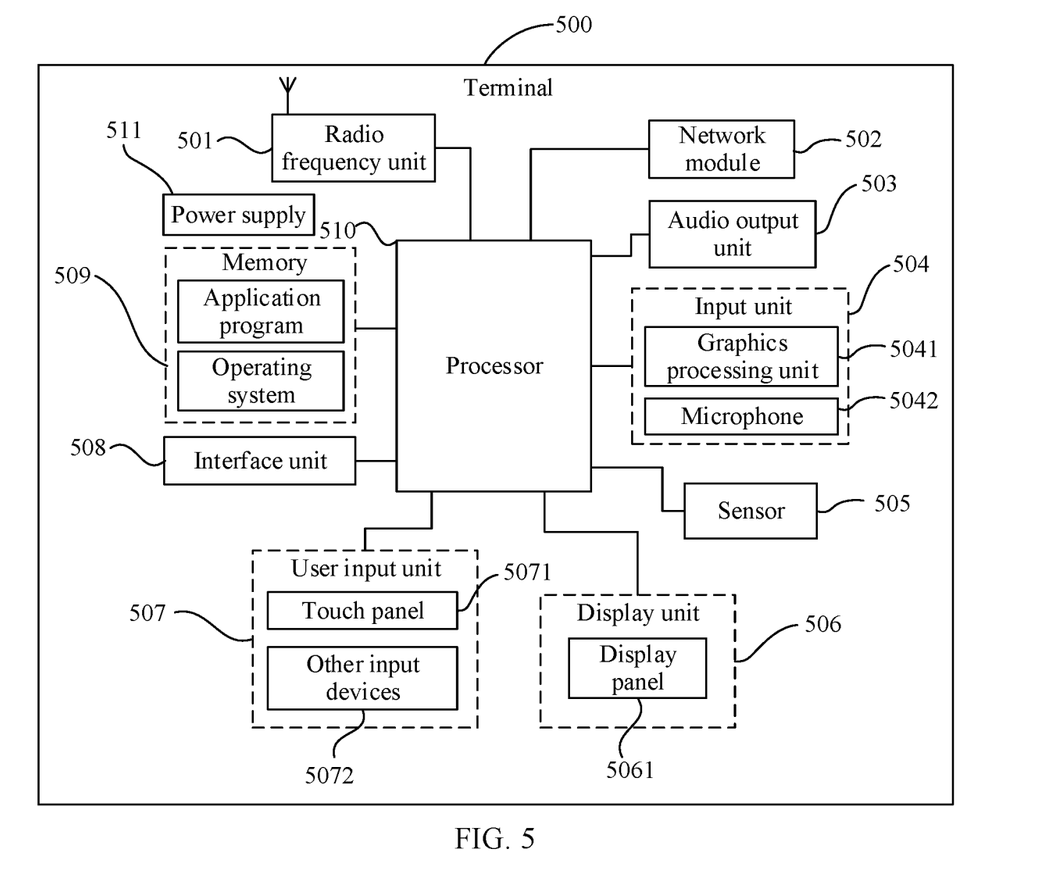
FIG. 5 is a second schematic structural diagram of a terminal according to an embodiment of this disclosure.

Specifically, FIG. 5 is a schematic diagram of a hardware structure of a terminal for implementing the embodiments of this disclosure. The terminal 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that the structure of the terminal shown in FIG. 5 does not constitute any limitation on the terminal. The terminal may include more or fewer components than those shown in the figure, or have some of the components combined, or have the components arranged differently. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 501 is configured to receive DCI.

The processor 510 is configured to determine a target bit sequence of to-be-transmitted HARQ-ACK information, where the to-be-transmitted HARQ-ACK information includes first information, and the first information is HARQ-ACK information that has not been successfully reported before and that is triggered by the DCI; and transmit the to-be-transmitted HARQ-ACK information by using the target bit sequence.

The terminal 500 in this embodiment of this disclosure can determine a feedback bit sequence of the to-be-transmitted HARQ-ACK information and effectively transmit the to-be-transmitted HARQ-ACK information when the network device triggers or requests the terminal to report the HARQ-ACK information that has not been successfully reported before, thereby ensuring a feedback effect.

It should be understood that, in this embodiment of this disclosure, the radio frequency unit 501 may be configured to: receive and transmit signals in an information receiving/transmitting process or a call process; and specifically, after receiving downlink data from a base station, transmit the downlink information to the processor 510 for processing, and in addition, transmit uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may also communicate with a network and other devices via a wireless communications system.

The terminal provides a user with wireless broadband internet access through the network module 502, for example, helping the user to send and receive e-mails, browse web pages, and access streaming media.

The audio output unit 503 may convert audio data received by the radio frequency unit 501 or the network module 502 or stored in the memory 509 into an audio signal and output the audio signal as a sound. Furthermore, the audio output unit 503 may also provide audio output (for example, a call signal received sound or a message received sound) related to a specific function performed by the terminal 500. The audio output unit 503 includes a speaker, a buzzer, a receiver, and the like.

The input unit 504 is configured to receive an audio or video signal. The input unit 504 may include a graphics processing unit (GPU) 5041 and a microphone 5042. The graphics processing unit 5041 processes image data of a still picture or video obtained by an image capture apparatus (such as a camera) in a video capture mode or an image capture mode. A processed image frame may be displayed on the display unit 506. The image frame processed by the graphics processing unit 5041 may be stored in the memory 509 (or another storage medium) or be transmitted by the radio frequency unit 501 or the network module 502. The microphone 5042 is capable of receiving sounds and processing such sounds into audio data. The processed audio data may be converted in a telephone call mode into a format that can be transmitted by the radio frequency unit 501 to a mobile communications base station, for outputting.

The terminal 500 may further include at least one sensor 505, for example, an optical sensor, a motion sensor, and another sensor. Specifically, the optical sensor may include an ambient light sensor and a proximity sensor. The ambient light sensor may adjust luminance of the display panel 5061 based on brightness of ambient light, and the proximity sensor may turn off the display panel 5061 and/or backlight when the terminal 500 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 505 may also include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by the user or information provided to the user. The display unit 506 may include a display panel 5061, and the display panel 5061 may be configured in a form of a liquid crystal display (LCD), an organic light-emitting diode (OLED), or the like.

The user input unit 507 may be configured to receive input digit or character information and generate key signal input related to user setting and function control of the terminal. Specifically, the user input unit 507 may include a touch panel 5071 and other input devices 5072. The touch panel 5071 is also referred to as a touchscreen and can collect a touch operation (such as an operation performed by the user on the touch panel 5071 or near the touch panel 5071 with a finger or by using any proper object or accessory such as a stylus) of the user on or near the touch panel 5071. The touch panel 5071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 510, and can receive a command transmitted by the processor 510 and execute the command. In addition, the touch panel 5071 may be implemented in a plurality of forms, for example, as a resistive, capacitive, infrared, or surface acoustic wave touch panel. In addition to the touch panel 5071, the user input unit 507 may further include other input devices 5072. Specifically, the other input devices 5072 may include but are not limited to a physical keyboard, a function key (such as a volume control key or an on/off key), a trackball, a mouse, and a joystick. Details are not described herein.

Further, the touch panel 5071 may cover the display panel 5061. When detecting a touch operation on or near the touch panel 5071, the touch panel 5071 transmits the touch operation to the processor 510 to determine a type of a touch event. Then, the processor 510 provides a corresponding visual output on the display panel 5061 based on the type of the touch event. Although in FIG. 5, the touch panel 5071 and the display panel 5061 act as two independent parts to implement input and output functions of the terminal, in some embodiments, the touch panel 5071 and the display panel 5061 may be integrated to implement the input and output functions of the terminal. This is not specifically limited herein.

The interface unit 508 is an interface between an external apparatus and the terminal 500. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 508 may be configured to: receive input (for example, data information and power) from the external apparatus, and transmit the received input to one or more elements in the terminal 500, or may be configured to transmit data between the terminal 500 and the external apparatus.

The memory 509 may be configured to store software programs and various data. The memory 509 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 509 may include a high-speed random access memory, and may further include a non-volatile memory such as at least one disk storage device, a flash memory device, or another volatile solid-state storage device.

The processor 510 is a control center of the terminal, and is connected to all components of the terminal by using various interfaces and lines. By running or executing a software program and/or module that is stored in the memory 509 and calling data stored in the memory 509, the processor 510 executes various functions of the terminal and processes data, so as to perform overall monitoring on the terminal. The processor 510 may include one or more processing units. Optionally, an application processor and a modem processor may be integrated in the processor 510. The application processor primarily processes an operating system, user interfaces, application programs, and the like. The modem processor primarily processes radio communication. It can be understood that the modem processor may alternatively be not integrated in the processor 510.

The terminal 500 may further include the power supply 511 (for example, a battery) supplying power to all components. Optionally, the power supply 511 may be logically connected to the processor 510 through a power management system. In this way, functions such as charge management, discharge management, and power consumption management are implemented by using the power management system.

In addition, the terminal 500 includes some functional modules that are not shown. Details are not described herein.

An embodiment of this disclosure further provides a computer-readable storage medium, where a computer program is stored in the computer-readable storage medium. When the computer program is executed by a processor, the processes of the embodiments of the foregoing information transmission method applied to the terminal can be implemented, with the same technical effects achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more restrictions, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the related art, may be implemented in a form of a software product. The software product is stored in a storage medium, and includes several instructions for instructing a computer device (which may be a personal computer, a server, a network device, or the like) to perform all or some of the steps of the method described in the embodiments of this disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer readable storage medium. When the program runs, the processes of the method embodiments may be included. The foregoing storage medium may be a magnetic disk, an optical disc, a read-only memory (ROM), a random access memory (RAM), or the like.

It may be understood that the embodiments described in this disclosure may be implemented by hardware, software, firmware, middleware, microcode, or a combination thereof. For hardware implementation, a module, a unit, a sub-unit, a sub-module, and the like may be implemented in one or more application specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. An information transmission method, applied to a terminal and comprising:
    receiving downlink control information (DCI);
    determining a target bit sequence of to-be-transmitted hybrid automatic repeat request acknowledgement (HARQ-ACK) information, wherein the to-be-transmitted HARQ-ACK information comprises first information, and the first information is HARQ-ACK information that has not been successfully reported before and that is triggered by the DCI; and
    transmitting the to-be-transmitted HARQ-ACK information by using the target bit sequence;
    wherein the first information corresponds to at least one first downlink transmission set, each first downlink transmission set corresponds to one triggering procedure, each first downlink transmission set corresponds to at least one HARQ-ACK sub-codebook, and each HARQ-ACK sub-codebook has one index value; and
    the target bit sequence comprises any one of the following:
    bit sequences of HARQ-ACK sub-codebooks corresponding to index values, wherein the bit sequences are concatenated based on an ascending order of the index values; and
    bit sequences of HARQ-ACK sub-codebooks, wherein the bit sequences are concatenated based on an order of triggering time for the first information.

2. The method according to claim 1, wherein the determining a target bit sequence of to-be-transmitted hybrid automatic repeat request acknowledgement HARQ-ACK information comprises:
    determining downlink assignment index (DAI) numbers of downlink transmissions corresponding to the to-be-transmitted HARQ-ACK information, wherein each of the downlink transmissions corresponding to the to-be-transmitted HARQ-ACK information has one DAI number; and
    determining the target bit sequence of the to-be-transmitted HARQ-ACK information based on the DAI numbers of the downlink transmissions corresponding to the to-be-transmitted HARQ-ACK information.

3. The method according to claim 2, wherein the DAI numbers of the downlink transmissions corresponding to the to-be-transmitted HARQ-ACK information are any one of the following:
    DAI numbers that are determined based on an order of triggering time for the first information;
    DAI numbers that are determined based on an order of scheduling time for downlink transmissions corresponding to the first information; and
    DAI numbers that are determined based on an ascending order of numbers of downlink transmission groups, wherein the first information corresponds to at least one first downlink transmission group, each first downlink transmission group has one serial number, and an order of DAI numbers of downlink transmissions in each first downlink transmission group is determined based on a scheduling order; and DAI numbers corresponding to downlink transmission groups with adjacent numbers are contiguous before a modulo operation.

4. The method according to claim 2, wherein the to-be-transmitted HARQ-ACK information is transmitted on a same uplink resource, and the DAI numbers of the downlink transmissions corresponding to the to-be-transmitted HARQ-ACK information are contiguous before a modulo operation and increment sequentially from a smallest DAI number.

5. The method according to claim 2, wherein the to-be-transmitted HARQ-ACK information further comprises second information, and the second information is HARQ-ACK information for a downlink transmission scheduled by the DCI.

6. The method according to claim 5, wherein the DAI numbers of the downlink transmissions corresponding to the to-be-transmitted HARQ-ACK information are any one of the following:
- DAI numbers that are determined based on an order of triggering times for the first information and scheduling time for downlink transmissions corresponding to the second information;
- DAI numbers that are determined based on an order of scheduling time for downlink transmissions that are corresponding to the first information and the second information; and
- DAI numbers that are determined based on an ascending order of numbers of downlink transmission groups; wherein the first information corresponds to at least one first downlink transmission group, each first downlink transmission group has one serial number, and an order of DAI numbers of downlink transmissions in each first downlink transmission group is determined based on a scheduling order; the second information corresponds to at least one second downlink transmission group, each second downlink transmission group has one serial number, and an order of DAI numbers of downlink transmissions in each second downlink transmission group is determined based on a scheduling order; and DAI numbers corresponding to downlink transmission groups with adjacent numbers are contiguous before a modulo operation.

7. The method according to claim 6, wherein in a case that the DAI numbers of the downlink transmissions corresponding to the to-be-transmitted HARQ-ACK information are determined based on an ascending order of the numbers of the downlink transmission groups, DAI numbers corresponding to the at least one second downlink transmission group are located at the end part of all DAI numbers.

8. The method according to claim 2, wherein the first information corresponds to at least one first downlink transmission set, each first downlink transmission set corresponds to at least one first downlink transmission group, and each first downlink transmission set corresponds to one triggering procedure; and
the DCI comprises at least one piece of trigger information, each piece of trigger information is transmitted for one triggering procedure, each piece of trigger information comprises first indication information, and the first indication information is used to indicate any one of the following:
- a quantity of DAI numbers occupied by a corresponding first downlink transmission set; and
- a quantity of DAI numbers occupied by each corresponding first downlink transmission group.

9. The method according to claim 8, wherein the first indication information is further used to indicate any one of the following:
- a start DAI number of a corresponding first downlink transmission set;
- a start DAI number of each corresponding first downlink transmission group;
- an end DAI number of a corresponding first downlink transmission set; and
- an end DAI number of each corresponding first downlink transmission group.

10. The method according to claim 1, wherein the to-be-transmitted HARQ-ACK information further comprises second information, and the second information is HARQ-ACK information for a downlink transmission scheduled by the DCI.

11. The method according to claim 10, wherein the first information corresponds to at least one first downlink transmission set, each first downlink transmission set corresponds to one triggering procedure, and each first downlink transmission set corresponds to at least one HARQ-ACK sub-codebook; and the second information corresponds to at least one second downlink transmission set, each second downlink transmission set corresponds to one HARQ-ACK sub-codebook, and each HARQ-ACK sub-codebook has one index value; and
the target bit sequence comprises any one of the following:
- bit sequences of HARQ-ACK sub-codebooks corresponding to index values, wherein the bit sequences are concatenated based on an ascending order of the index values; and
- bit sequences of HARQ-ACK sub-codebooks, wherein the bit sequences are concatenated based on an order of triggering time for the first information and scheduling time for downlink transmissions corresponding to the second information.

12. The method according to claim 11, wherein a HARQ-ACK sub-codebook corresponding to the at least one second downlink transmission set is located at the start or end part of the target bit sequence.

13. The method according to claim 11, wherein the second information corresponds to one second downlink transmission set, and in a case that a dynamic codebook is used, second downlink transmission sets are in a one-to-one correspondence to downlink transmission groups.

14. The method according to claim 1, wherein the first information corresponds to one first downlink transmission set, the first downlink transmission set corresponds to one HARQ-ACK sub-codebook, and the first downlink transmission set corresponds to one downlink transmission group.

15. The method according to claim 14, wherein DAI numbers are accumulated independently in each downlink transmission group.

16. The method according to claim 1, wherein the target bit sequence comprises indicator bits, and the indicator bits are used to indicate index values of concatenated HARQ-ACK sub-codebooks in the target bit sequence.

17. The method according to claim 1, further comprising:
transmitting second indication information to a network device, wherein
the second indication information is used to indicate a length of each HARQ-ACK sub-codebook based on a concatenating order of the target bit sequence;
and/or,
further comprising:
transmitting third indication information to a network device, wherein
the third indication information is used to indicate an index value of each HARQ-ACK sub-codebook based on a concatenating order of the target bit sequence;
and/or,
wherein in a case that a quantity of bits of the target bit sequence exceeds a preset proportion of a quantity of all current HARQ processes, before the transmitting the to-be-transmitted HARQ-ACK information by using the target bit sequence, the method further comprises:
determining a to-be-actually-transmitted HARQ-ACK bit sequence, wherein a quantity of bits of the to-be-actually-transmitted HARQ-ACK bit sequence is less than or equal to the quantity of all the current HARQ processes; and the transmitting the to-be-transmitted HARQ-ACK information by using the target bit sequence comprises:

transmitting HARQ-ACK information of all the current HARQ processes by using the to-be-actually-transmitted HARQ-ACK bit sequence.

18. A terminal, comprising a memory, a processor, and a computer program stored in the memory and capable of running on the processor, wherein when the computer program is executed by the processor, an information transmission method is implemented, and the method comprises:

receiving downlink control information (DCI);

determining a target bit sequence of to-be-transmitted hybrid automatic repeat request acknowledgement (HARQ-ACK) information, wherein the to-be-transmitted HARQ-ACK information comprises first information, and the first information is HARQ-ACK information that has not been successfully reported before and that is triggered by the DCI; and transmitting the to-be-transmitted HARQ-ACK information by using the target bit sequence;

wherein the first information corresponds to at least one first downlink transmission set, each first downlink transmission set corresponds to one triggering procedure, each first downlink transmission set corresponds to at least one HARQ-ACK sub-codebook, and each HARQ-ACK sub-codebook has one index value; and the target bit sequence comprises any one of the following:

bit sequences of HARQ-ACK sub-codebooks corresponding to index values, wherein the bit sequences are concatenated based on an ascending order of the index values; and bit sequences of HARQ-ACK sub-codebooks, wherein the bit sequences are concatenated based on an order of triggering time for the first information.

19. A non-transitory computer-readable storage medium, storing a computer program, wherein when the computer program is executed by a processor, an information transmission method is implemented, and the method comprises:

receiving downlink control information (DCI);

determining a target bit sequence of to-be-transmitted hybrid automatic repeat request acknowledgement (HARQ-ACK) information, wherein the to-be-transmitted HARQ-ACK information comprises first information, and the first information is HARQ-ACK information that has not been successfully reported before and that is triggered by the DCI; and transmitting the to-be-transmitted HARQ-ACK information by using the target bit sequence;

wherein the first information corresponds to at least one first downlink transmission set, each first downlink transmission set corresponds to one triggering procedure, each first downlink transmission set corresponds to at least one HARQ-ACK sub-codebook, and each HARQ-ACK sub-codebook has one index value; and the target bit sequence comprises any one of the following:

bit sequences of HARQ-ACK sub-codebooks corresponding to index values, wherein the bit sequences are concatenated based on an ascending order of the index values; and bit sequences of HARQ-ACK sub-codebooks, wherein the bit sequences are concatenated based on an order of triggering time for the first information.

* * * * *